US 8,206,489 B2

(12) United States Patent
Cadours et al.

(10) Patent No.: US 8,206,489 B2
(45) Date of Patent: Jun. 26, 2012

(54) METHOD OF DEACIDIZING A GAS WITH A FRACTIONAL REGENERATION ABSORBENT SOLUTION WITH CONTROL OF THE WATER CONTENT OF THE SOLUTION

(75) Inventors: Renaud Cadours, Francheville (FR); Pierre-Louis Carrette, Lyons (FR); Pierre Boucot, Ternay (FR)

(73) Assignee: Institut Francais du Petrole, Cedex (FR)

( * ) Notice: Subject to any disclaimer, the term of this patent is extended or adjusted under 35 U.S.C. 154(b) by 575 days.

(21) Appl. No.: 12/158,346

(22) PCT Filed: Dec. 19, 2006

(86) PCT No.: PCT/FR2006/002798
§ 371 (c)(1),
(2), (4) Date: Sep. 28, 2009

(87) PCT Pub. No.: WO2007/077323
PCT Pub. Date: Jul. 12, 2007

(65) Prior Publication Data
US 2010/0011958 A1    Jan. 21, 2010

(30) Foreign Application Priority Data
Dec. 22, 2005 (FR) .................................... 05 13178

(51) Int. Cl.
*B01D 53/14* (2006.01)
(52) U.S. Cl. ............... 95/179; 95/181; 95/183; 95/188; 95/193; 95/195; 95/196; 95/197; 95/209; 95/235; 95/236; 423/228; 423/229
(58) Field of Classification Search .......... 95/187–188, 95/181, 183, 193–198, 205–206, 209, 235, 95/236; 423/228–229
See application file for complete search history.

(56) References Cited

U.S. PATENT DOCUMENTS

| 3,658,462 A |   | 4/1972 | Van Scoy |
| 3,899,312 A | * | 8/1975 | Kruis et al. ...................... 62/625 |
| 4,251,494 A |   | 2/1981 | Say |
| 6,969,418 B1 | * | 11/2005 | Hu ................................. 95/235 |
| 7,419,646 B2 | * | 9/2008 | Cadours et al. ............... 423/220 |
| 7,718,151 B1 | * | 5/2010 | Hu ................................. 423/220 |

FOREIGN PATENT DOCUMENTS

| EP | 1225967 B1 | * | 6/2000 |
| EP | 1225967 B1 | * | 10/2000 |
| EP | 1 225 967 B1 |   | 6/2003 |

* cited by examiner

*Primary Examiner* — Duane Smith
*Assistant Examiner* — Ives Wu
(74) *Attorney, Agent, or Firm* — Antonelli, Terry, Stout & Kraus, LLP.

(57) ABSTRACT

The present invention relates to a method of deacidizing a gaseous effluent, wherein the following stages are carried out:
a) contacting the gaseous effluent with an absorbent solution so as to obtain a gaseous effluent depleted in acid compounds and an absorbent solution laden with acid compounds, the absorbent solution being selected for its property to form two separable phases when it absorbs an amount of acid compounds,
b) separating the absorbent solution laden with acid compounds into two fractions: a first absorbent solution fraction depleted in acid compounds and a second absorbent solution fraction enriched in acid compounds,
c) regenerating the second fraction so as to release part of the acid compounds,
d) mixing a predetermined amount of water with the first absorbent solution fraction obtained in stage b) or with the regenerated absorbent solution fraction obtained in stage c), then
e) recycling the first absorbent solution fraction and the regenerated absorbent solution as the absorbent solution.

12 Claims, 3 Drawing Sheets

METHOD OF DEACIDIZING A GAS WITH A FRACTIONAL REGENERATION ABSORBENT SOLUTION WITH CONTROL OF THE WATER CONTENT OF THE SOLUTION

FIELD OF THE INVENTION

The present invention relates to the field of deacidizing a gaseous effluent.

BACKGROUND OF THE INVENTION

Deacidizing gaseous effluents such as, for example, natural gas, synthesis gas, combustion fumes, refinery gas, Claus tail gas, biomass fermentation gas, cement works gas, blast-furnace gas, is generally carried out by washing with an absorbent solution. The absorbent solution allows the acid compounds present in the gaseous effluent to be absorbed. The physico-chemical characteristics of this solution are closely linked with the nature of the gas to be treated: specification expected for the treated gas, selective elimination of a contaminant, thermal and chemical stability of the solution towards the various compounds present in the gaseous effluent to be treated.

Deacidizing of these effluents, notably decarbonation and desulfurization, imposes specific requirements on the absorbent solution:

selectivity towards carbon dioxide in relation to oxygen and nitrogen in the case of fumes, in relation to hydrocarbons in the case of natural gas, thermal stability, chemical stability, notably towards the contaminants in the effluent, i.e. essentially oxygen, $SO_x$ and $NO_x$, and low vapour pressure, in order to limit absorbent solution losses at the top of the deacidizing column.

Currently, the most commonly used solvents are primary, secondary or tertiary aqueous alkanolamine solutions. In fact, the $CO_2$ absorbed reacts with the alkanolamine present in solution according to a reversible exothermic reaction.

An alternative to aqueous alkanolamine solutions is the use of hot carbonate solutions. The principle is based on the absorption of the $CO_2$ in the aqueous solution, followed by the reversible chemical reaction with the carbonates. It is known that addition of additives allows the solvent efficiency to be optimized.

Other decarbonation methods by washing with an absorbent solution such as, for example, refrigerated methanol or polyethylene glycols, are based on a physical absorption of the $CO_2$.

In general terms, the use of all the absorbent solutions described above involves a quite significant energy consumption for regeneration of the separation agent. Regeneration of the absorbent solution is generally carried out by entrainment by a vaporized gas commonly referred to as stripping gas. The thermal energy required for regeneration is split up in three parts linked with heating of the absorbent solution between the absorption stage and the regeneration stage (sensible heat of the absorbent solution), its vaporization heat and the binding energy between the absorbed species and the absorbent solution. The binding energy is all the higher as the physico-chemical affinity between the solvent compounds and the acid compounds to be removed is high. In the particular case of alkanolamines, it is more expensive to regenerate a very basic primary alkanolamine such as MonoEthanolAmine than a tertiary amine such as MethylDiEthanolAmine. The vaporization heat of the absorbent solution has to be taken into account since the thermal regeneration stage requires vaporization of a quite significant fraction of the absorbent solution in order to obtain the stripping effect that favours elimination of the acid compounds contained in the absorbent solution. This absorbent solution fraction to be vaporized is proportional to the extent of the association between the absorbed contaminant and the absorbent solution. However, an easily vaporizable absorbent solution is penalized by absorbent solution losses by entrainment upon contact between the gas feed to be treated and the absorbent solution. The part of the sensible heat is essentially linked with the absorption capacity of the absorbent solution: it is in fact proportional to the flow rate of the absorbent solution to be regenerated. The distribution of the energy cost of the regeneration stage between the sensible heat, the vaporization heat and the absorbed gas-absorbent solution binding enthalpy essentially depends on the physico-chemical properties of the absorbent solution and of the absorbed compound.

The present invention relates to a method for deacidizing a gas. The invention proposes to decrease the amount of energy required to regenerate an absorbent solution laden with acid compounds.

The present invention uses an absorbent solution that has the property of forming two separable phases when it has absorbed a predetermined amount of acid compounds: a first phase rich in acid compounds and a second phase poor in acid compounds. This two-phase separation property allows to regenerate only the phase laden with acid compounds.

SUMMARY OF THE INVENTION

In general terms, the present invention relates to a method of deacidizing a gaseous effluent comprising at least one acid compound of the group consisting of hydrogen sulfide ($H_2S$), mercaptans, carbon dioxide ($CO_2$), sulfur dioxide ($SO_2$), carbon oxysulfide (COS) and carbon disulfide ($CS_2$), wherein the following stages are carried out:

a) contacting the gaseous effluent with an absorbent solution so as to obtain a gaseous effluent depleted in acid compounds and an absorbent solution laden with acid compounds, the absorbent solution being selected for its property to form two separable phases when it absorbs an amount of acid compounds, b) separating the absorbent solution laden with acid compounds into two fractions: a first absorbent solution fraction depleted in acid compounds and a second absorbent solution fraction enriched in acid compounds, c) regenerating the second fraction so as to release part of the acid compounds, d) mixing a predetermined amount of water with at least one of the following fractions: the first absorbent solution fraction obtained in stage b) or with the regenerated absorbent solution fraction obtained in stage c), then e) recycling the first absorbent solution fraction and the regenerated absorbent solution as the absorbent solution to stage a).

According to the invention, the absorbent solution can comprise a compound that reacts with at least one of said acid compounds, the reactive compound being selected from the group consisting of amines, alkanolamines, amino-acids, amino-acid alkaline salts, amides, ureas, alkaline metal phosphates, carbonates and borates.

Furthermore, the absorbent solution can comprise a solvation compound selected from the group consisting of water, glycols, polyethylene glycols, polypropylene glycols, ethylene glycol-propylene glycol copolymers, glycol ethers, alcohols, ureas, lactames, N-alkylated pyrrolidones, N-alkylated piperidones, cyclotetramethylene sulfones, N-alkylformamides, N-alkylacetamides, ether-ketones, alkyl phosphates and derivatives thereof.

Besides, the absorbent solution can comprise a salt selected from the group consisting of alkaline salts, alkaline-earth salts, metal salts and amine salts.

According to the invention, one of the following separation techniques can be used in stage b): decantation, centrifugation, filtration.

In stage c), the second absorbent solution fraction can be distilled so as to produce a regenerated absorbent solution depleted in acid compounds by releasing acid compounds in gaseous form.

Alternatively, in stage c), the second fraction can be expanded so as to produce a liquid by releasing acid compounds in gaseous form, then the acid compounds released can be discharged and the liquid can be separated into a first regenerated absorbent solution portion that is depleted in acid compounds and a third absorbent solution fraction. In this case, the third absorbent solution fraction can be expanded so as to produce a second regenerated absorbent solution portion depleted in acid compounds and acid compounds released in gaseous form by expansion. It is also possible to distil the third absorbent solution fraction so as to produce a second regenerated absorbent solution portion depleted in acid compounds by releasing acid compounds in gaseous form.

Furthermore, prior to stage c), at least an expansion of the first absorbent solution fraction can be carried out and a gaseous effluent released upon expansion is discharged.

The method according to the invention can be applied to the treatment of a gaseous effluent selected from the group comprising natural gas, synthesis gas, combustion fumes, refinery gas, Claus tail gas, biomass fermentation gas, cement works gas, blast-furnace gas, or any other gas comprising acid gases as described in the invention.

In the case of an application of the method according to the invention to the absorption of the carbon dioxide present in combustion fumes, natural gas, cement works gas or blast-furnace gas, to the treatment of Claus tail gas or to the desulfurization of natural gas and of refinery gas, an absorbent solution comprising one of the following reactive compound/solvation compound pairs can be used:

N,N,N',N',N''-pentamethyldiethylenetriamine/water,
N,N,N',N',N''-pentamethyldipropylenetriamine/water,
N,N-Bis(2,2-diethoxyethyl)methylamine/water,
N,N-dimethyldipropylenetriamine/tetraethyleneglycoldimethylether/water,
N,N-dimethyldipropylenetriamine/water.

BRIEF DESCRIPTION OF THE FIGURES

Other features and advantages of the invention will be clear from reading the description hereafter, with reference to the accompanying figures wherein.

DETAILED DESCRIPTION

Figure 1:
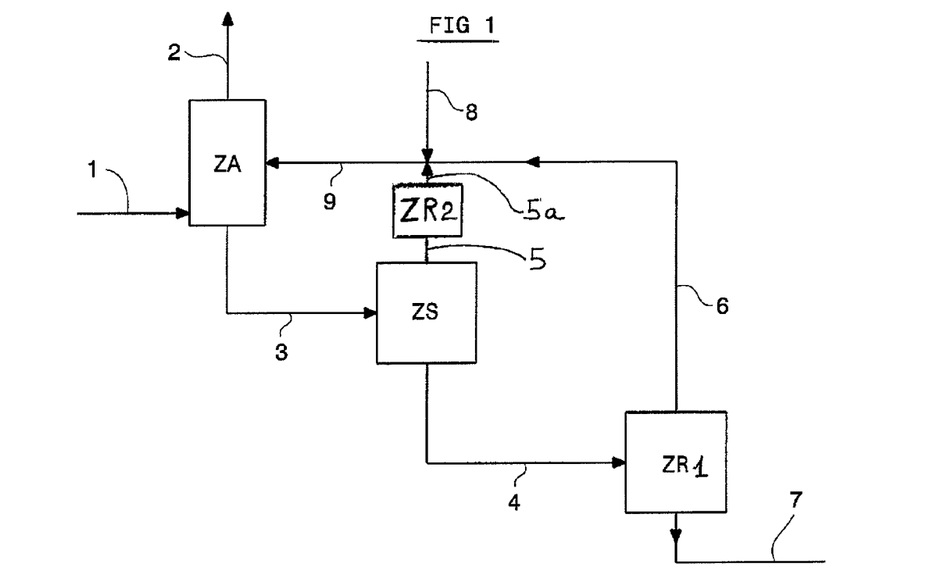
FIG. 1 diagrammatically shows a deacidizing method with fractional regeneration of the absorbent solution.

In FIG. 1, the gaseous effluent to be deacidized flows in through line 1. The deacidizing method diagrammatically shown in FIG. 1 can be applied to the treatment of various gaseous effluents. For example, the method allows to decarbonate combustion fumes, to deacidize natural gas or a Claus tail gas. The method also allows to remove the acid compounds contained in synthesis gas, in conversion gas in integrated coal or natural gas combustion plants, and in the gas resulting from biomass fermentation.

Within the context of combustion fumes decarbonation, the typical composition of a gaseous effluent corresponds, by volume, to 75% nitrogen, 15% carbon dioxide, 5% oxygen and 5% water. Various contaminants such as $SO_x$, $NO_x$, Ar and other particles are also present in lower proportions, they generally represent less than 2% by volume. The temperature of these fumes ranges between 50° C. and 180° C., the pressure is generally below 15 bars.

The natural gas essentially consists of 25% to 99% by volume of hydrocarbons, essentially methane, together with hydrocarbons having generally 2 to 6 carbon atoms. The presence of carbon dioxide in proportions ranging between 1% and 75% by volume $CO_2$ is often observed. Other contaminants, essentially sulfur compounds such as mercaptans, COS and $H_2S$, can be present in concentrations ranging from some ppm up to 50% by volume. The natural gas is generally available at pressures ranging between 20 and 100 bars, and at temperatures ranging between 20° C. and 60° C. The transportation conditions, the temperature and the pressure define the water content of this gaseous effluent.

Concerning Claus tail gases, their final treatment often involves hydrogenation and hydrolysis stages in order to convert all of the sulfur-containing species to hydrogen sulfide, itself collected by means of a deacidizing method using an alkanolamine-based solvent. A typical example of this method is the SCOT method. The gases to be treated during the absorption stage are then available at pressures often close to atmospheric pressure and at temperatures close to 50° C., conventionally ranging between 38° C. and 55° C. These gases contain on average less than 5% by volume of $H_2S$, most often less than 2%, up to 50% carbon dioxide, the rest of the gas essentially consisting of nitrogen. These gases can be saturated with water, for example they can contain about 5% by volume of water.

The other gaseous effluents requiring deacidizing for safety or transportation reasons, or according to their use, such as synthesis gas, conversion gas in integrated coal or natural gas combustion plants, gas resulting from biomass fermentation, have very variable availability conditions depending on their origin, notably as regards the temperature, pressure, composition of the gas and its acid gas concentrations.

In general terms, the acid compounds to be removed from the gaseous effluent flowing in through line 1 are Brönsted acids such as hydrogen sulfide ($H_2S$) or mercaptans, notably methylmercaptan and ethylmercaptan, and Lewis acids such as carbon dioxide ($CO_2$), sulfur dioxide ($SO_2$), or carbon oxysulfide (COS) and carbon disulfide ($CS_2$). These acid compounds are generally encountered in proportions ranging between some ppm and several percents, for example up to 75% for $CO_2$ and $H_2S$ in natural gas.

The gaseous effluent flowing in through line 1 can be available at pressures ranging between atmospheric pressure for postcombustion fumes and 150 bars, preferably 100 bars for natural gas. In the case of low-pressure gaseous effluents, a compression stage can be considered in order to reach pressure ranges favoring implementation of the present invention. The temperature of this effluent generally ranges between 0° C. and 300° C., preferably between 20° C. and 180° C., considering a natural gas as well as a combustion fume. It can however be controlled (by heating or cooling) in order to favour capture of the acid compounds by the absorbent solution.

The gaseous effluent flowing in through line 1 is contacted in absorption zone ZA with the liquid absorbent solution flowing in through line 9. Conventional techniques for contacting a gas and a liquid can be used: bubble column, plate column, packed column, with random or stacked packing, stirred reactors in series, membrane contactors, etc.

The absorbent solution is selected for its aptitudes to absorb the acid compounds in zone ZA. The gaseous effluent depleted in acid compounds is discharged from zone ZA through line 2. The absorbent solution laden with acid compounds is discharged from zone ZA through line 3.

Furthermore, according to the invention, the absorbent solution is selected for its property to form at least two separable phases when it has absorbed a predetermined proportion of acid compounds, under predetermined thermodynamic conditions. The solution laden with acid compounds forms a first phase enriched in molecules of the absorbent solution that have not reacted with the acid compounds and a second phase enriched in molecules of the solution that have reacted with the acid compounds.

The contacting technique used in zone ZA is suited to the nature and to the formation properties of the two phases.

The absorbent solution can consist of one or more compounds reactive with or having a physico-chemical affinity with the acid compounds and possibly one or more solvation compounds. An absorbent solution comprising compounds reactive with the acid compounds is preferably selected. The compound(s) possibly used for solvation of the reactive compound(s) can carry functions reactive with the acid compounds to be treated.

The reactive compounds can be any compound whose reaction with one or more acid compounds, for example $H_2S$, $CO_2$ or $SO_2$, or mercaptans, or COS or $CS_2$, leads to the formation of a second phase, for example liquid or solid. Thus, absorption of one or more acid compounds by the absorbent solution leads to the formation of an equilibrium between two liquid phases or between a liquid phase and a solid phase. The absorbent solution is preferably selected so as to form two liquid phases when it has absorbed a predetermined amount of acid compounds.

The nature of the reactive compounds can be selected according to the nature of the acid compound(s) to be treated to allow a reversible chemical reaction with the acid compound(s) to be treated. The chemical structure of the reactive compounds can also be selected so as to furthermore obtain increased stability of the absorbent solution under the conditions of use.

The reactive compounds can be, by way of non limitative example, amines (primary, secondary, tertiary, cyclic or not, aromatic or not, saturated or not), alkanolamines, polyamines, amino-acids, amino-acid alkaline salts, amides, ureas, alkaline metal phosphates, carbonates or borates.

The reactive compounds comprising an amine function preferably have the following structure:

X represents an amine function (N—$R^6$) or an oxygen atom (O) or a sulfur atom (S) or a disulfide (S—S) or a carbonyl function (C═O) or a carboxyl function (O═C—O) or an amide function (O═C—N—$R^6$) or a phenyl or a nitrile function (C≡N) or a nitro group ($NO_2$).

n and m are integers. n can have any value from 0 to 8, preferably from 0 to 6, and m any value from 1 to 7, preferably from 1 to 5.

$R^5$ represents either a hydrogen atom or a hydrocarbon chain, branched or not, saturated or not, comprising 1 to 12 carbon atoms, preferably 1 to 10 carbon atoms. $R^5$ is absent when X represents a nitrile function (C≡N) or a nitro group ($NO_2$).

$R^1$, $R^2$, $R^3$, $R^4$ and $R^6$ represent either a hydrogen atom or a hydrocarbon chain, branched or not, saturated or not, comprising 1 to 12 carbon atoms, preferably 1 to 10 carbon atoms, or they have the following structure:

n and p are integers. n can have any value from 0 to 8, preferably from 0 to 6, and p any value from 0 to 7, preferably from 0 to 5.

$R^3$ and $R^4$ have the same definition as above, they can be identical or of a different nature.

$R^1$, $R^2$, $R^3$, $R^4$, $R^5$ and $R^6$ are defined so as to be possibly bound by a chemical bond in order to form cycles or heterocycles, saturated or not, aromatic or not.

By way of non limitative example, the reactive compounds comprising an amine function can be selected from the following list: monoethanolamine, diethanolamine, triethanolamine, 2-(2-aminoethoxy)ethanol (diglycolamine), N,N-dimethylamino-ethoxyethanol, N,N,N'-trimethyl-N'-hydroxyethyl-bisaminoethylether, N,N-bis-(3-dimethylaminopropyl)-N-isopropanolamine, N-(3-dimethylaminopropyl)-N,N-diisopropanolamine, N,N-dimethylethanolamine, N-methylethanolamine, N-methyldiethanolamine, diiso-propanolamine, morpholine, N-methylmorpholine, N-ethylmorpholine, N,N-dimethyl-1,3-propanediamine, N,N,N-tris(3-dimethyl-aminopropyl)amine, N,N,N',N'-tetramethyliminobispropylamine, N-(3-amino-propyl)morpholine, 3-methoxypropylamine, N-(2-aminoethyl)piperazine, bis-(2-dimethylaminoethyl)ether, 2,2-dimorpholinodiethylether, N,N'-dimethylpiperazine, N,N,N',N',N''-pentamethyldiethylenetriamine, N,N,N',N',N''-pentamethyldipropylenetriamine, N,N-Bis(2,2-diethoxyethyl)methylamine, 3-butyl-2-(1-ethyl-pentyl)oxazolidine, 3-ethyl-2-methyl-2-(3-methylbutyl)oxazolidine, 1,2,2,6,6-pentamethyl-4-piperidone, 1-(2-methylpropyl)-4-piperidone, N,N,N',N'-tetraethyl-ethylenediamine, N,N,N',N'-tetraethyliminobisethylamine, 1,1,4,7,10,10-hexamethyltriethylenetetramine, 1-phenylpiperazine, 1-formylpiperazine, ethyl 1-piperazinecarboxylate, N,N'-di-tert-butylethylenediamine, 4-ethyl-2-methyl-2-(3-methylbutyl)oxazolidine, tetraethylenepentamine, triethylenetetramine, N,N-diethyldiethylenetriamine, N1-isopropyldiethylenetriamine, N,N-dimethyldipropylenetriamine, diethylenetriamine, N-(2-aminoethyl)-1,3-propanediamine, 2,2'-(ethylenedioxy)diethylamine, N-(2-aminoethyl)morpholine, 4-amino-2,2,6,6-tetramethylpiperidine, 1,2-diaminocyclohexane, 2-piperidinoethylamine, 2-(2-aminoethyl)-1-methylpyrrolidine, ethylenediamine, N,N-diethylethylenediamine, N-phenylethylenediamine, 4,9-dioxa-1,12-dodecanediamine, 4,7,10-trioxa-1,13-tridecanediamine, 1,2,4-trimethylpiperazine, N,N'-diethyl-N,N'-dimethylethylenediamine, N,N-diethyl-N',N'-dimethylethylenediamine, 1,4,7-trimethyl-1,4,7-triazacyclononane, 1,4-dimethyl-1,4- diazacycloheptane, N-(2-dimethylaminoethyl)-N'-methylpiperazine, N,N,N',N'-tetraethylpropylenediamine, 1-[2-(1-piperidinyl)ethyl)]piperidine, 4,4'-ethylenedimorpholine, N,N,N',N'-tetraethyl-N''-methyl-dipropylenetriamine, 4-(dimethylamino)-1,2,2,6,6-pentamethylpiperidine, 1,5,9-trimethyl-1,5,9-triazacyclododecane, 1,4,8,11-tetramethyl-1,4,8,11-tetraazacyclotetradecane, N,N'-difurfurylethylenediamine, 1,2-Bis(2-aminoethyl)thioethane, Bis(2-aminoethyl)disulfide, Bis(2-dimethylaminoethyl)sulfide, 1-acetyl-2-diethylaminoethane, 1-amino-2-benzylaminoethane, 1-acetyl-3-dimethylaminopropane, 1-dimethylamino-3,3-diphenylpropane, 2-(dimethylamino-methyl)thiophene, N,N,5-trimethylfurfurylamine, N,N-Bis(tetrahydro-2-furanyl-methyl)amine, 2-(ethylsulfanyl)ethanamine, thiomorpholine, 2-[(2-aminoethyl)sulfanyl]ethanol, 3-thiomorpholinylmethanol, 2-(butylamino)ethanethiol, Bis(2-diethylaminoethyl)ether, 1-dimethylamino-2-ethylmethylaminoethoxyethane, 1,2,3-triaminopropane, N~1~-(2-aminopropyl)-1,2-propanediamine, N,N-dimethylbenzylamine, N-methylbenzylamine, N-ethylbenzylamine, N-propylbenzylamine, N-isopropylbenzylamine, N-butylbenzylamine, N-tertiobutylbenzylamine, N-phenetylbenzylamine, dibenzylamine, N-benzylpiperidone, 1,2,3,4-tetrahydroisoquinoline, 1-(2-methoxyphenyl)piperazine, 2-methyl-1-(3-methylphenyl)piperazine, 1-(2-pyridinyl)piperazine, N-methyldiphenylmethanamine, benzhydrylamine, N-benzyl-N',N'-dimethylethylenediamine, 3-(methylamino)propionitrile, 3-(ethylamino)propionitrile, 3-(dimethylamino)propionitrile, 3-(diethylamino)propionitrile, 3-(propylamino)propionitrile, 3-(butylamino)propionitrile, 3-(tertiobutylamino)propionitrile, 3-(pentylamino)propionitrile, 3-(hexylamino)propionitrile, 3-(cyclohexylamino)propionitrile, 3-aminopropionitrile, 3-(octylamino)propionitrile, 3-(dibutylamino)propionitrile, 3-(1-piperidino)propionitrile, hexahydro-1H-azepine-1-propionitrile and 3-(dipropylamino)propionitrile.

The solvation compounds can be all the compounds that dissolve in sufficient amount the reactive compounds or that are miscible with the reactive compounds described above and lead to the formation of two phases, liquid-liquid or liquid-solid for example, when they are associated with at least one of the reactive compounds that have reacted with one or more acid compounds, for example $H_2S$, $CO_2$ or $SO_2$, or mercaptans, COS or $CS_2$.

The solvation compounds can be preferably water, glycols, polyethylene glycols, polypropylene glycols, ethylene glycol-propylene glycol copolymers, glycol ethers, thioglycols, thioalcohols, sulfones, sulfoxides, alcohols, ureas, lactames, N-alkylated pyrrolidones, N-alkylated piperidones, cyclotetramethylene sulfones, N-alkylformamides, N-alkylacetamides, ether-ketones, alkyl phosphates, alkylene carbonates or dialkyl carbonates and derivatives thereof. By way of non limitative water, they can be water, tetraethylene glycol dimethylether, sulfolane, N-methylpyrrolidone, 1,3-dioxan-2-one, propylene carbonate, ethylene carbonate, diethyl carbonate, diisobutyl carbonate, diphenyl carbonate, glycerol carbonate, dimethylpropyleneurea, N-methylcaprolactam, dimethylformamide, dimethylacetamide, formamide, acetamide, 2-methoxy-2-methyl-3-butanone, 2-methoxy-2-methyl-4-pentanone, 1,8-dihydroxy-3,6-dithiaoctane, 1,4-dithiane-2,5-diol, 2-(methylsulfonyl)ethanol, tetrahydropyrimidone, dimethylthiodipropionate, bis(2-hydroxyethyl)sulfone, 3-mercapto-1,2-propanediol, 2,3-dimercapto-1-propanol, 1,4-dithioerythritol, 2-mercaptobenzimidazole, 2-mercaptobenzothiazole, 2-mercaptothiazoline or tributylphosphate. Preferably, the solvent contains at least water.

The reactive compounds can represent 10 to 100% by weight of the solvent, preferably 25 to 90% by weight, and ideally 40 to 80% by weight.

The absorbent solution can possibly also contain one or more activators for favoring absorption of the compounds to be treated. It can be, for example, amines, amino-acids, amino-acid alkaline salts, alkaline metal phosphates, carbonates or borates.

The activators comprising an amine function can preferably have the structure as follows:

X represents an amine function ($N—R^6$) or an oxygen atom (O) or a sulfur atom (S) or a disulfide (S—S) or a carbonyl function (C=O) or a carboxyl function (O=C—O) or an amide function (O=C—N—$R^6$) or a phenyl or a nitrile function (C≡N) or a nitro group ($NO_2$).

n and m are integers. n can have any value from 0 to 8, preferably from 0 to 6, and m any value from 1 to 7, preferably from 1 to 5.

$R^5$ represents either a hydrogen atom or a hydrocarbon chain, branched or not, saturated or not, comprising 1 to 12 carbon atoms, preferably 1 to 10 carbon atoms. $R^5$ is absent when X represents a cyano function (C≡N) or a nitro group ($NO_2$).

$R^1$, $R^2$, $R^3$, $R^4$ and $R^6$ represent either a hydrogen atom or a hydrocarbon chain, branched or not, saturated or not, comprising 1 to 12 carbon atoms, preferably 1 to 10 carbon atoms, or they have the following structure:

n and p are integers. n can have any value from 0 to 8, preferably from 0 to 6, and p any value from 0 to 7, preferably from 0 to 5.

$R^3$ and $R^4$ have the same definition as above, they can be identical or of a different nature.

$R^1$, $R^2$, $R^3$, $R^4$, $R^5$ and $R^6$ are defined so as to be possibly bound by a chemical bond in order to form cycles or heterocycles, saturated or not, aromatic or not.

$R^1$, $R^2$ and $R^6$ are defined in such a way that at least one of them represents a hydrogen atom.

The activator concentration ranges between 0 and 30% by weight, preferably between 0 and 15% by weight of the absorbent solution.

The activators can for example be selected from the following list: monoethanolamine, diethanolamine, 2-(2-aminoethoxy)ethanol (diglycolamine), N-methylethanolamine, N-ethylethanolamine, N-propylethanolamine, N-butylethanolamine, N-(2-amino ethyl)ethanol amine, diisopropanolamine, 3-amino-1-propanol, morpholine, N,N-dimethyl-1,3-propanediamine, N,N,N',N'-tetramethyliminobispropylamine, N-(3-aminopropyl)morpholine, 3-methoxypropylamine, 3-ethoxypropylamine, N-(2-aminoethyl)piperazine, N-(3-aminopropyl)piperazine, N,N,N',N'-tetraethyliminobisethylamine, 1-phenylpiperazine, 1-formylpiperazine, ethyl 1-piperazinecarboxylate, N,N'-di-tert-butylethylenediamine, 4-ethyl-2-methyl-2-(3-methylbutyl)oxazolidine, tetraethylenepentamine, triethylenetetramine, N,N-diethyldiethylenetriamine, N~1~-isopropyldiethylenetriamine, N,N-dimethyldipropylenetriamine, dipropylenetriamine, diethylenetriamine, N-(2-aminoethyl)-1,3-propanediamine, 2,2'-(ethylenedioxy)diethylamine, N-(2-amino-ethyl)morpholine, 4-amino-2,2,6,6-tetraméthylpiperidine, N-(2-aminoethyl)piperidine, N-(3-aminopropyl)piperidine, 1,2-diaminocyclohexane, N-cyclohexyl-1,3-propane-diamine, 2-piperidinoethylamine, 2-(2-aminoethyl)-1-methylpyrrolidine, ethylene-diamine, N,N-diethylethylenediamine, N-phenylethylenediamine, 4,9-dioxa-1,12-dodecanediamine, 4,7,10-trioxa-1,13-tridecanediamine, furfurylamine, N,N'-difurfurylethylenediamine, 1,2-Bis(2-aminoethyl)thioethane, Bis(2-aminoethyl)disulfide, Bis(aminoethyl)sulfide, 1-amino-2-benzylaminoethane, 2-(aminomethyl)thiophene, N,N-Bis (tetrahydro-2-furanylmethyl)amine, 2-(ethylsulfanyl) ethanamine, thio-morpholine, 2-[(2-aminoethyl)sulfanyl] ethanol, 2-(butylamino)ethanethiol, 1,2,3-triaminopropane, 1,3-diaminopropane, 1,4-diaminobutane, 1,5-diaminopentane, hexamethylenediamine, 1,2-propanediamine, 2-methyl-1,2-propanediamine, 2-methylpiperazine, N~2~,N~2~-dimethyl-1,2-propanediamine, N~1~,N~1~-dimethyl-1,2-propanediamine, 2,6-dimethylpiperazine, 1-ethyl-3-piperidinamine, N~1~-(2-aminopropyl)-1,2-propanediamine, decahydroquinoxaline, 2,3,5,6-tetramethyl-piperazine, N,N-dimethyl(2-piperidinyl) methanamine, 1-(2-piperidinyl-methyl)piperidine, 2,2-dimethyl-1,3-propanediamine, N~1,N~3~,2-trimethyl-1,3-propanediamine, 2-(aminomethyl)-2-methyl-1,3-propanediamine, N~1~,N~1,2,2-tetra-methyl-1,3-propanediamine, 1-methoxy-2-propanamine, tetrahydro-2-furanylmethylamine, 2,6-dimethylmorpholine, N-methyl (tetrahydro-2-furanyl)methanamine, N-methylbenzylamine, N-ethylbenzylamine, N-propylbenzylamine, N-isopropylbenzylamine, N-butylbenzylamine, N-tertiobutylbenzylamine, N-phenetylbenzylamine, dibenzylamine, 1,2,3,4-tetrahydroisoquinoline, 1-(2-methoxyphenyl)piperazine, 2-methyl-1-(3-methylphenyl)piperazine, 1-(2-pyridinyl)piperazine, N-methyldiphenylmethanamine, benzhydrylamine, N-benzyl-N',N'-dimethylethylenediamine, 3-(methylamino) propionitrile, 3-(ethylamino)propionitrile, 3-(propylamino) propionitrile, 3-(butylamino)propionitrile, 3-(tertiobutylamino)propionitrile, 3-(pentylamino)propionitrile, 3-(hexylamino)propionitrile, 3-(cyclohexylamino)propionitrile, 3-aminopropionitrile and 3-(octylamino)propionitrile.

The absorbent solution can also comprise one or more salts in order to lower the acid gas partial pressure at which a second phase forms by reaction of the acid gases with the reactive compound(s). These salts can be, by way of non limitative example, alkaline, alkaline-earth, metal or amine salts. The associated anion can be, by way of non limitative example, a halogenide, a phosphate, a sulfate, a nitrate, a nitrite, a phosphite or the conjugate base of a carboxylic acid. The amine(s) used for these salts can be one or more of the amines present in the absorbent solution as reactive compounds with the acid compounds, or as activator, and which are partly neutralized by one or more stronger acids than the acids present in the gaseous effluent treated. The acids used can be, by way of non limitative example, phosphoric acid, phosphorous acid, nitrous acid, oxalic acid, acetic acid, formic acid, propanoic acid, butanoic acid, nitric acid, sulfuric acid or hydrochloric acid. Other amine types totally neutralized by such acids can also be added to the absorbent solution.

These salts can also result from the partial degradation of the absorbent solution, for example after reaction of the reactive compounds with a contaminant in the treated gas. The salts can also be obtained by introducing soda or potash to neutralize acids formed in the plant implementing the method. Besides, addition of salts can possibly be avoided in cases where the activators, the reactive compounds or any other additive are salts by nature. The salt concentration can be adjusted according to the partial pressure and to the nature of the acid compound(s) present in the gas feed to be treated, and to the implementation conditions.

The absorbent solution can also contain anti-corrosion and/or anti-foaming additives. Their nature and concentration are selected depending on the nature of the absorption solvent used, on the feed to be treated and on the implementation conditions. Their concentration in the absorbent solution typically ranges between 0.01% and 5% by weight. These agents can be vanadium oxides (for example $V_2O_3$) or chromates (for example $K_2Cr_2O_7$).

The composition of the absorbent solution is notably determined depending on the nature of the gaseous effluent to be treated and on the conditions of implementation of the deacidizing method.

For application of the method according to the invention to the decarbonation of combustion fumes, the decarbonation of natural gas, the decarbonation of cement works gas, the decarbonation of blast-furnace gas, Claus tail gas treatment or natural gas and refinery gas desulfurization, an absorbent solution comprising one of the following reactive compound/solvation compound pairs is preferably used:

N,N,N',N',N''-pentamethyldiethylenetriamine/water,
N,N,N',N',N''-pentamethyldipropylenetriamine/water,
N,N-Bis(2,2-diethoxyethyl)methylamine/water,
N,N-dimethyldipropylenetriamine/tetraethylenegylcoldimethylether/water,
N,N-dimethyldipropylenetriamine/water.

The absorbent solution once laden with acid compounds comprises two phases and it is fed through line 3 into separation zone ZS. The two phases are separated in zone ZS. Separation can be carried out by decantation, i.e. by phase density difference under the effect of gravity. The residence time in zone ZS can be adjusted according to the settling velocity of the two phases. Phase separation techniques using centrifugation or filtration can also be used.

Separation allows to obtain a first fraction rich in molecules that have not reacted with the acid compounds. This first absorbent solution fraction is depleted in acid compounds in relation to the absorbent solution flowing in through line 3. On the other hand, separation allows to obtain a second fraction rich in molecules that have reacted with the acid compounds. This second absorbent solution fraction is enriched in acid compounds in relation to the absorbent solution flowing in through line 3.

The first fraction is discharged from zone ZS through line 5, then fed into absorption zone ZA.

Possibly, the first fraction circulating in line 5 can be regenerated in zone ZR2. For example, regeneration can comprise expansion followed by separation in order to separate the gases released by expansion of the liquid. The liquid produced by expansion in ZR2 is discharged through line 5a.

The second fraction is discharged from zone ZS through line 4 and fed into regeneration zone ZR1. In zone ZR1, the acid compounds are separated from the absorbent solution.

Zone ZR1 can use regeneration by expansion and/or thermal regeneration, i.e. by temperature rise.

The acid compounds are discharged from zone ZR1 through line 7. The regenerated absorbent solution fraction, i.e. depleted in acid compounds, is discharged through line 6 and fed into zone ZA.

The absorbent solution circulating in line 6 and the first fraction circulating in line 5 or in line 5a can be mixed, then fed through line 9 into absorption zone ZA. Alternatively, the two streams circulating in lines 5 or 5a and 6 can also be introduced separately at two different points in zone ZA.

Furthermore, make-up absorbent solution can flow in through line 8 and be fed into zone ZA through line 9. This make-up solution notably allows the proportion of absorbent solution possibly lost in zone ZR1 to be replaced.

Figure 2:
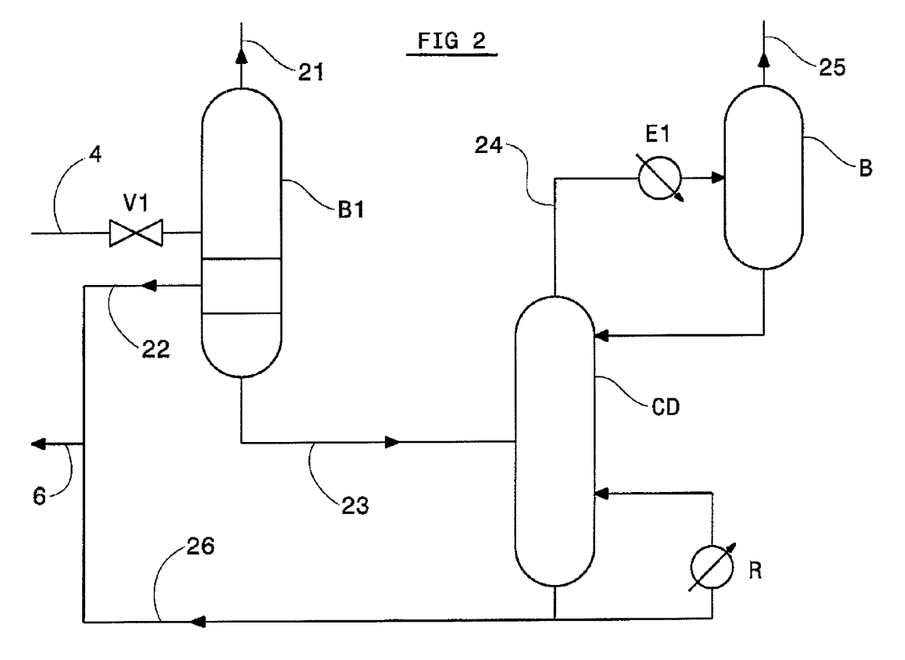
FIG. 2 shows an embodiment of the solvent regeneration.

The diagram of FIG. 2 shows in detail regeneration zone ZR1. The reference numbers of FIG. 2 similar to those of FIG. 1 designate the same elements.

The second absorbent solution fraction flowing in through line 4 is rich in molecules that have reacted with the acid compounds. This second fraction has to be regenerated, i.e. freed of the acid compounds it has absorbed.

Regeneration can be carried out by expansion and/or temperature rise. The diagram of FIG. 2 shows regeneration by expansion and by temperature rise.

The second fraction flowing in through line 4 is expanded through expansion means V1. The expansion means can comprise a valve, a turbine or a combination of a valve and of a turbine. Expansion allows the second fraction to be partly regenerated. In fact, the pressure drop allows to release in gaseous form part of the acid compounds contained in the second fraction, as well as the gaseous species of the feed co-absorbed in contacting zone ZA. These co-absorbed species are mainly hydrocarbons in the case of treatment of a natural gas.

The effluent obtained after expansion in V1 comprises three phases: a gas phase comprising acid compounds released by expansion, a liquid phase of regenerated absorbent solution depleted in acid compounds and a liquid or solid phase that remains laden with acid compounds. These three phases are separated in separation means B1, a drum for example. The acid compounds released by expansion are discharged through line 21. Considering the proportions of the co-absorbed species and of the acid gases in the gaseous effluent resulting from expansion, the latter can for example be retreated in order to remove the acid gases for immediate use, either be mixed with the feed flowing in through line 1, or be re-mixed with the acid gases coming from the regeneration stage through line 7. The part of the absorbent solution that has been regenerated is discharged through line 22. The part of the absorbent solution that is laden with acid compounds is discharged through line 23 and fed into distillation column CD.

Thermal regeneration in column CD is carried out according to conventional techniques: random or stacked packing distillation column, plate column, etc. The conditions of implementation of the distillation performed in column CD are adjusted according to the physico-chemical properties of the solution to be regenerated. The solution temperature increase allows to release the acid compounds in gaseous form. The bottom of column CD is provided with a reboiler R. The gaseous fraction discharged at the top of column CD through line 24 is partly condensed in heat exchanger E1, then fed into drum B. The condensates collected at the bottom of drum B are introduced at the top of column CD as reflux. The effluent rich in acid compounds is discharged from drum B through line 25. The regenerated solution, i.e. the solution from the regeneration stage, is discharged at the bottom of column CD through line 26.

The streams of regenerated absorbent solution circulating in lines 22 and 26 can be mixed, then sent through line 6 to zone ZA. Alternatively, these two regenerated absorbent solution streams can be sent separately to zone ZA.

Without departing from the scope of the invention, two to three levels of regeneration by expansion can be positioned before the thermal regeneration stage.

During deacidizing of a gaseous effluent, it is well known that the deacidizing solvent is fed into the deacidizing column at a higher temperature than the gaseous feed to be treated. It is all the more important to control this temperature difference in case of treatment of a natural gas in order to prevent hydrocarbon condensation phenomena in the absorption column.

If we also take into account the exothermicity of the reaction between the acid compounds and the molecules of the absorption solution, the gaseous feed to be treated flowing from the absorption column is thus at a higher temperature than the feed when it is fed into the column. The deacidizing solvent therefore undergoes a water loss in the absorption column.

Besides, the gaseous effluents resulting from the regeneration carried out in zone ZR1 (for example the streams from lines 21 and 25 of FIG. 2) are systematically saturated with water. A significant water loss is thus also observed.

The present invention proposes to control the water content of the absorbent solution by compensating for the losses linked with the process by a judiciously located make-up water supply.

The products resulting from the reaction between the acid compounds and the reactive compounds of the absorption solution are ionic species. The water present in the solvent therefore divides up in zone ZS, with the major part in the phase rich in ionic species.

Upon separation of the two phases in zone ZS, a phase enriched in ionic species and in water and a second phase enriched in unreacted molecules and depleted in water are thus obtained.

Furthermore, it is well known that an insufficient amount of water limits the reactivity with the acid compounds of the gaseous effluent.

In reference to FIG. 1, the make-up water can be introduced upstream from the point where the absorbent solution is recycled to absorption zone ZA. For example, the make-up water is mixed with the absorbent solution flowing in through lines 5 or 5a or 6. This mixture is then fed through line 9 into zone ZA.

Figure 3:
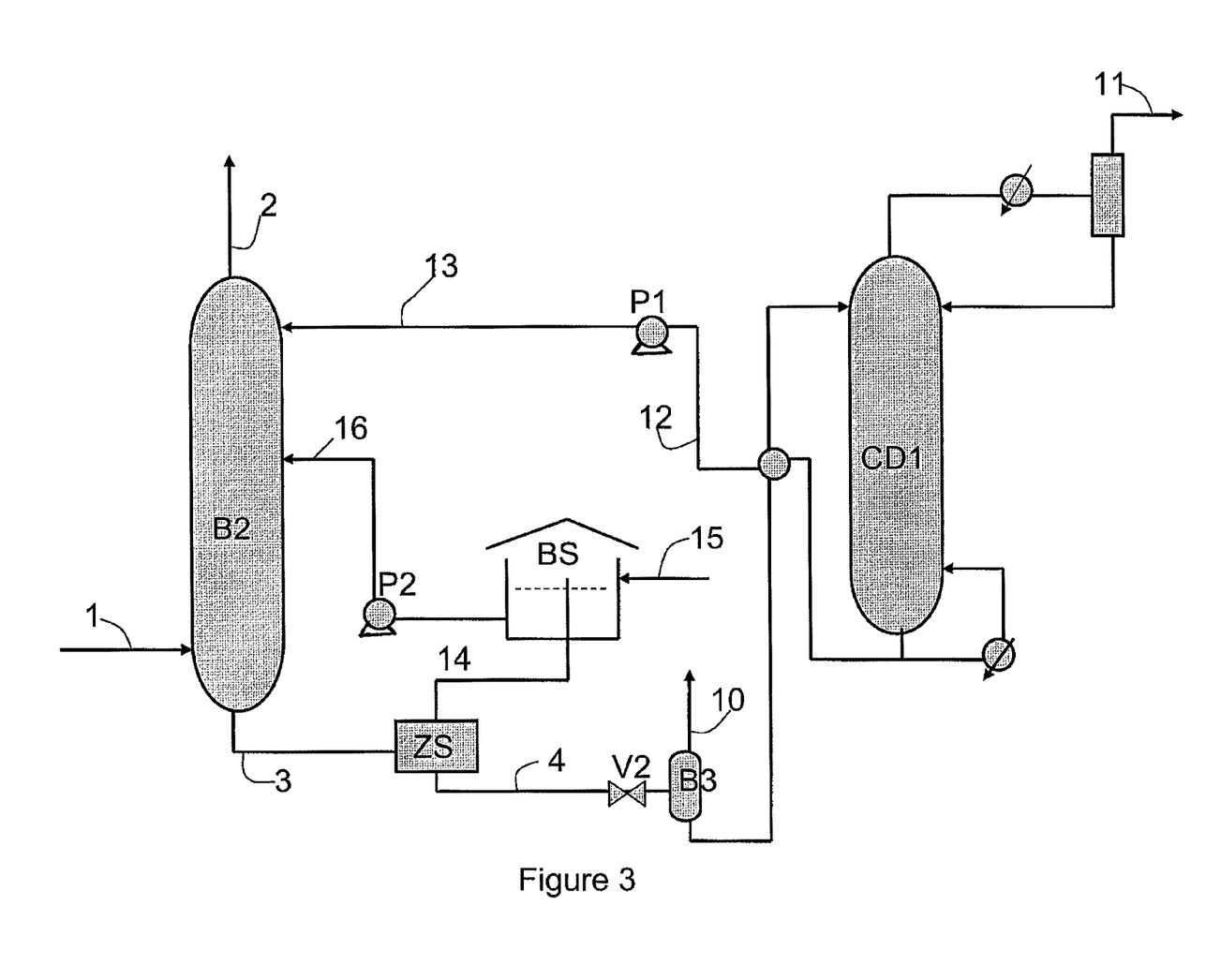
FIGS. 3 and 4 show two embodiments of the deacidizing method according to the invention.

The diagram of FIG. 3 shows in detail an embodiment of the method according to the invention with control of the water concentration of the absorbent solution. The reference numbers of FIG. 3 similar to those of FIG. 1 designate the same elements.

In reference to FIG. 3, the gas laden with acid compounds flows in through line 1, and it is contacted in column B2 with a first absorbent solution fraction flowing in through line 13 and with a second absorbent solution fraction flowing in through line 16. The gas depleted in acid compounds is discharged from B2 through line 2. The absorbent solution laden with acid compounds is discharged from B2 through line 3, then separated into two fractions in separation zone ZS.

It is interesting to take advantage of the demixing stage in zone ZS by injecting the two absorbent solution fractions at different points into absorption column B2. For example, the fraction that is the more reactive with the acid compounds of the gaseous effluent can be injected at the top of column B2 so as to optimize the treatment efficiency.

The absorbent solution fraction enriched in molecules that have reacted with the acid compounds is expanded by valve V2, then fed into drum B3. The gaseous effluents released by expansion are discharged through line 10. The liquid part discharged from drum B3 is distilled in column CD1 so as to be regenerated. The acid compounds released upon distillation are discharged through line 11. The regenerated absorbent solution fraction discharged at the bottom of column CD1 through line 12 is pumped by pump P1, then fed through line 13 into column B2.

The absorbent solution fraction enriched in molecules that have not reacted with the acid compounds is discharged from separation zone ZS through line 14 and fed into storage tank BS.

In this case, the make-up water is preferably added to the phase that is the poorer in water so as to ensure a minimum content favoring chemical reactions between the acid compounds and the amines in solution. In the case where the phase rich in absorption reaction products preferably solubilizes water, the fraction obtained in ZS, rich in unreacted molecules, is enriched in water prior to being re-injected into column B2. In reference to FIG. 3, line 15 carries the make-up water to tank BS. The absorbent solution contained in the tank is pumped by pump P2, then fed through line 16 into absorption column B2.

The absorbent solution injection levels through lines 13 and 16 are determined according to their reactivity with the acid compounds of the gaseous effluent. In FIG. 3, line 13 is at a higher level than line 16, but the opposite is also possible.

The various absorption solution supplies to column B2 can be obtained by different recombinations of the effluents coming from lines 13, 14 and 16 in order to optimize the reactivity of the various fractions by controlling the proportion of water and of compounds reactive with the acid gases of the gaseous effluent.

Within the context of regeneration in several stages, for example various expansion stages, the different absorbent solution fractions obtained by demixing can be each enriched in water prior to being re-injected at different points of absorption zone ZA. An alternative option can consist in mixing these various solvent fractions and in adding water to the mixture prior to introduction at a single level into absorption zone ZA.

Figure 4:
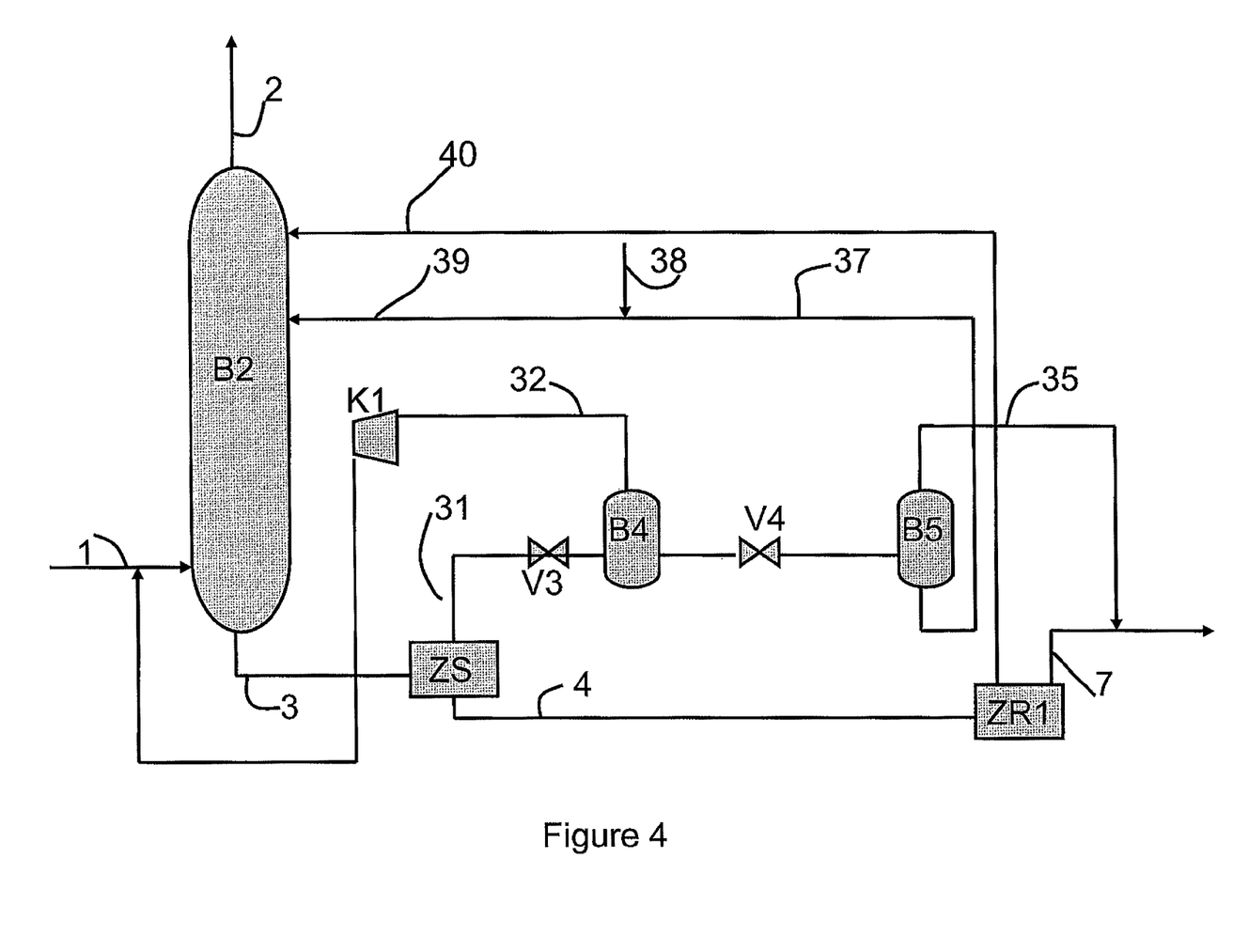

The diagram of FIG. 4 shows an embodiment of the method according to the invention with control of the water concentration of the absorbent solution. The reference numbers of FIG. 4 similar to those of FIG. 1 or 3 designate the same elements.

The gas to be treated is fed through line 1 into absorption column B2 and contacted with an absorbent solution flowing in through lines 39 and 40. The gas depleted in acid compounds is discharged from zone B2 through line 2.

According to the operating conditions, the demixing phenomenon, i.e. separation between the molecules that have reacted with the acid compounds and the unreacted molecules, can be initiated in absorption column B2. Therefore, if the water concentrates in the phase rich in reaction products, or if the water content of the phase essentially containing the unreacted molecules is insufficient, this phase can behave as a physical solvent. In this case, acid compounds present in the feed to be treated solubilize in a purely physical manner in this phase comprising the unreacted molecules.

The absorbent solution laden with acid compounds is discharged from B2 through line 3 and fed into zone ZS.

The phase essentially comprising the unreacted molecules, as well as the physically solubilized acid compounds, can be directly recycled to the process by being injected into absorption column B2.

Alternatively, in reference to FIG. 4, insofar as acid compounds are physically absorbed by the absorbent solution in B2, it can be advantageous to carry out expansion of the phase essentially comprising the unreacted molecules. In reference to FIG. 4, the phase comprising the major part of the unreacted molecules, resulting from the separation carried out in ZS and coming from line 31, is expanded by valve V3, then fed into drum B4. The gaseous fraction released upon expansion in V3 essentially comprises hydrocarbons and co-absorbed acid compounds. This gaseous fraction can be discharged from B4 through line 32, compressed by compressor K1 and recycled by being mixed with the feed gas. The liquid obtained at the bottom of drum B4 is expanded by valve V4, then fed into drum B5. The gaseous fraction released upon expansion in V4 essentially comprises acid compounds. This fraction can be discharged through line 35, for example with the acid compounds discharged upon regeneration in ZR1. The liquid obtained at the bottom of drum B5 is a regenerated absorbent solution that is discharged through line 37. Make-up water is added through line 38 to this absorbent solution fraction. The mixture of absorbent solution and of water is then fed through line 39 into column B2.

The absorbent solution fraction comprising the reacted molecules is discharged from ZS through line 4, then fed through line 4 to regeneration zone ZR1. The acid compounds are discharged from ZR1 through line 7. The regenerated absorbent solution from ZR1 is fed through line 40 into column B2. The absorbent solution injection levels through lines 39 and 40 are determined according to their reactivity with the acid compounds of the gaseous effluent. In FIG. 4, line 40 is at a higher level than line 39, but the opposite is also possible.

The various absorption solution supplies to column B2 can be obtained by different recombinations of the effluents coming from lines 37, 39 and 40 in order to optimize the reactivity of the various fractions by controlling the proportion of water and of compounds reactive with the acid gases of the gaseous effluent.

Alternatively to FIG. 4, the gaseous effluent circulating in line 32 can be used on the site where the method according to the invention is implemented to produce the energy required for the utilities. A deacidizing stage can be carried out so that the specifications compatible with the use of the effluent are met.

The numerical examples hereafter allow the method according to the invention to be illustrated.

EXAMPLE 1

A solvent containing 80% by weight of N,N,N',N',N''-pentamethyldipropylenetriamine and 20% by weight of water is contacted at 40° C. and at atmospheric pressure in a gas-liquid contactor with a gaseous $N_2$—$CO_2$ mixture containing 30% by volume of $CO_2$. Absorption of the carbon dioxide in the solvent leads to demixing of the solvent into two liquid phases. The absorbed $CO_2$ is concentrated in the heavy phase with 70% of the water initially present in the solvent. This phase represents 28% of the total weight of solvent.

Addition of phosphoric acid (2% by mole of the amine) allows to obtain demixing with a gaseous $N_2$—$CO_2$ mixture containing 10% by volume of $CO_2$.

Regeneration by stripping with nitrogen or thermal regeneration by distillation of all or of a fraction of the two-phase solvent, notably the phase rich in absorbed $CO_2$, allows the solvent to recover its absorption capacity towards $CO_2$.

EXAMPLE 2

Various $H_2S$ injections are performed on 160.5 g of a water-N,N,N',N',N''-pentamethyldiethylenetriamine solvent of composition 25-75% by weight, at a temperature of 40° C. in a closed reactor. When the $H_2S$ partial pressure in the reactor exceeds 0.3 bar, separation of two liquid phases is observed. Sweeping with nitrogen allows to strip the hydrogen sulfide absorbed by the solvent which becomes a single-phase solvent again and recovers its absorption capacities.

EXAMPLE 3

We consider the case of a postcombustion fume containing 13% by volume of $CO_2$-Decarbonation of this effluent in order to capture 90% of the carbon dioxide is most often carried out by means of a method using an aqueous MEA solution.

The fume is treated at 40° C. by a solvent containing 30% by weight of MEA in aqueous solution. The alkanolamine is partly carbonated: 18% of the MEA is not regenerated during the regeneration stage applied to the total solvent used in the method. The energy cost in relation to the ton of $CO_2$ produced is essentially linked with the regeneration cost of the solvent containing up to 0.50 mole $CO_2$ per mole of amine when it is fed to the regeneration stage. The regeneration cost is estimated at 4.3 GJ/ton of $CO_2$, distributed between the sensible heat of the solvent, 10%, and especially between the vaporization heat and the reaction heat between the $CO_2$ and the monoethanolamine, 45% each.

In cases where, according to the invention, a tertiary amine such as N,N,N',N',N''-pentamethyldipropylenetriamine, 75% by weight in aqueous solution is used, a higher solvent flow rate is necessary to achieve 90% removal of the $CO_2$ initially present in the fume. The tertiary nature of the amine functions of the molecule however allows to reduce the part of the energy cost linked with the reaction heat between the $CO_2$ and the amine. Furthermore, considering that only a fraction of the solvent is thermally regenerated, after demixing of the absorbent solution fraction rich in carbonated species, the part of the regeneration cost linked with the sensible heat of the solvent is not influenced by the solvent flow rate increase required for decarbonation. The regeneration cost is then reduced to 2.7 GJ/ton of $CO_2$.

The invention claimed is:

1. A method of deacidizing a gaseous effluent comprising at least one acid compound of the group consisting of: hydrogen sulfide ($H_2S$), mercaptans, carbon dioxide ($CO_2$), sulfur dioxide ($SO_2$), carbon oxysulfide (COS) and carbon disulfide ($CS_2$), wherein the following stages are carried out:
   a) contacting the gaseous effluent with an absorbent solution so as to obtain a gaseous effluent depleted in acid compounds and an absorbent solution laden with acid compounds, the absorbent solution being selected for its property to form two separable phases when it absorbs an amount of acid compounds,
   b) separating the absorbent solution laden with acid compounds into two fractions: a first absorbent solution fraction depleted in acid compounds and a second absorbent solution fraction enriched in acid compounds,
   c) regenerating the second absorbent solution fraction enriched in acid compounds obtained in stage b) so as to release part of the acid compounds to provide a regenerated absorbent solution fraction,
   d) mixing a predetermined amount of water with the first absorbent solution fraction obtained in stage b) or with the regenerated absorbent solution fraction obtained in stage c), then
   e) recycling the first absorbent solution fraction and the regenerated absorbent solution fraction and the predetermined amount of water as the absorbent solution.

2. A method as claimed in claim 1, wherein the absorbent solution comprises a compound that reacts with at least one of said acid compounds, the reactive compound being selected from the group consisting of amines, alkanolamines, amino-acids, amino-acid alkaline salts, amides, ureas, alkaline metal phosphates, carbonates and borates.

3. A method as claimed in claim 2, wherein the absorbent solution comprises a solvation compound selected from the group consisting of water, glycols, polyethylene glycols, polypropylene glycols, ethylene glycol-propylene glycol copolymers, glycol ethers, thioglycols, thioalcohols, sulfones, sulfoxides, alcohols, ureas, lactames, N-alkylated pyrrolidones, N-alkylated piperidones, cyclotetramethylene sulfones, N-alkylformamides, N-alkylacetamides, ether-ketones, alkyl phosphates, alkylene carbonates or dialkyl carbonates and derivatives thereof.

4. A method as claimed in claim 2, wherein the absorbent solution comprises a salt selected from the group consisting of alkaline salts, alkaline-earth salts, metal salts and amine salts.

5. A method as claimed in claim 1 wherein, in stage b), one of the following separation techniques is used: decantation, centrifugation, filtration.

6. A method as claimed in claim 1 wherein, in stage c), the second absorbent solution fraction is distilled so as to produce a regenerated absorbent solution depleted in acid compounds by releasing acid compounds in gaseous form.

7. A method as claimed in claim 1 wherein, in stage c), the second fraction is expanded so as to produce a liquid by releasing acid compounds in gaseous form, then the acid compounds released are discharged and the liquid is separated into a first regenerated absorbent solution portion that is depleted in acid compounds and a third absorbent solution fraction.

8. A method as claimed in claim 7, wherein the third absorbent solution fraction is expanded so as to produce a second regenerated absorbent solution portion depleted in acid compounds and acid compounds released in gaseous form by expansion.

9. A method as claimed in claim 7, wherein the third absorbent solution fraction is distilled so as to produce a second regenerated absorbent solution portion depleted in acid compounds by releasing acid compounds in gaseous form.

10. A method as claimed in claim 1 wherein, prior to stage c), at least an expansion of the first absorbent solution fraction is carried out and a gaseous effluent released upon expansion is discharged.

11. A method as claimed in claim 1, wherein the gaseous effluent is selected from the group consisting of natural gas, synthesis gas, combustion fumes, refinery gas, Claus tail gas, biomass fermentation gas, cement works gas, blast-furnace gas.

12. A method as claimed in claim 1, applied to the absorption of carbon dioxide present in combustion fumes, natural gas, cement works gas or blast-furnace gas, to the treatment of Claus tail gas or to the desulfurization of natural gas and of refinery gas, wherein an absorbent solution comprising one of the following reactive compound/solvation compound pairs is used:

N,N,N',N',N"-pentamethyldiethylenetriamine/water,
N,N,N',N',N"-pentamethyldipropylenetriamine/water,
N,N-Bis(2,2-diethoxyethyl)methylamine/water,
N,N-dimethyldipropylenetriamine/tetraethyleneglycoldimethylether/water,
N,N-dimethyldipropylenetriamine/water.

* * * * *